United States Patent
Pascual Barrio et al.

(10) Patent No.: US 8,359,893 B2
(45) Date of Patent: Jan. 29, 2013

(54) METHOD FOR PRODUCING A SHOCK ABSORBER AND SHOCK ABSORBER THUS OBTAINED

(75) Inventors: Idoya Pascual Barrio, St. Esteve (ES); Francesc Perarnau Ramos, St. Esteve (ES); Isabel Garcia Bonilla, St. Esteve (ES)

(73) Assignee: Autotech Engineering A.I.E., (Abadiano (Bizkaia) (ES)

( * ) Notice: Subject to any disclaimer, the term of this patent is extended or adjusted under 35 U.S.C. 154(b) by 369 days.

(21) Appl. No.: 12/356,629

(22) Filed: Jan. 21, 2009

(65) Prior Publication Data

US 2009/0174197 A1    Jul. 9, 2009

Related U.S. Application Data

(63) Continuation of application No. PCT/ES2006/000432, filed on Jul. 21, 2006.

(51) Int. Cl.
*B21D 22/00* (2006.01)

(52) U.S. Cl. ............ 72/84; 72/85; 72/367.1; 72/370.14; 72/370.23

(58) Field of Classification Search ............... 72/82, 83, 72/84, 85, 367.1, 370.14, 370.23, 370.24, 72/105, 106, 370.16, 370.19; 293/132
See application file for complete search history.

(56) References Cited

U.S. PATENT DOCUMENTS

| | | | | |
|---|---|---|---|---|
| 1,647,185 A | * | 11/1927 | Mallory | 72/362 |
| 2,044,711 A | * | 6/1936 | Mantle | 72/59 |
| 2,925,116 A | * | 2/1960 | Eberle | 72/105 |
| 2,932,890 A | * | 4/1960 | Sporck et al. | 72/85 |
| 3,046,924 A | * | 7/1962 | Kanc | 72/85 |
| 3,120,206 A | * | 2/1964 | Sporck | 72/81 |
| 3,184,940 A | * | 5/1965 | Sporck | 72/68 |
| 3,740,986 A | * | 6/1973 | Schmid | 72/84 |
| 5,740,609 A | * | 4/1998 | Jurus | 29/894.324 |
| 6,554,333 B2 | | 4/2003 | Shimotsu et al. | |
| 6,648,384 B2 | * | 11/2003 | Nees et al. | 293/132 |
| 6,898,397 B2 | * | 5/2005 | Sakuma et al. | 399/159 |
| 6,908,129 B2 | | 6/2005 | Shimotsu | |
| 7,021,686 B2 | | 4/2006 | Glasgow et al. | |
| 7,152,708 B2 | * | 12/2006 | Campbell | 180/376 |
| 7,393,025 B2 | * | 7/2008 | Glasgow et al. | 293/132 |

FOREIGN PATENT DOCUMENTS

| | | |
|---|---|---|
| DE | 198 14 842 A1 | 10/1999 |
| DE | 100 02 379 A1 | 8/2001 |
| EP | 1 045 165 A1 | 10/2000 |
| JP | 2000-240707 | 9/2000 |

OTHER PUBLICATIONS

International Search Report for PCT International Application No. PCT/ES2006/000432 mailed Apr. 3, 2007.

* cited by examiner

*Primary Examiner* — Edward Tolan
(74) *Attorney, Agent, or Firm* — RatnerPrestia

(57) ABSTRACT

The method includes providing a planar sheet part; forming the planar sheet part by drawing or conical spinning to the shape of a partially formed part made up of a plate and a provisional hollow portion extending from the plate with a revolution shape with respect to an axis perpendicular to the plate, and an end wall closing an end of the provisional hollow portion opposite to the plate; and elongating a section of the provisional hollow portion by cylindrical or conical spinning. The shock absorber is integral with a plate and an elongated hollow portion extending from the plate with a revolution shape. A section of the elongated hollow portion has a thickness that is thinner than the thickness of the plate.

12 Claims, 7 Drawing Sheets

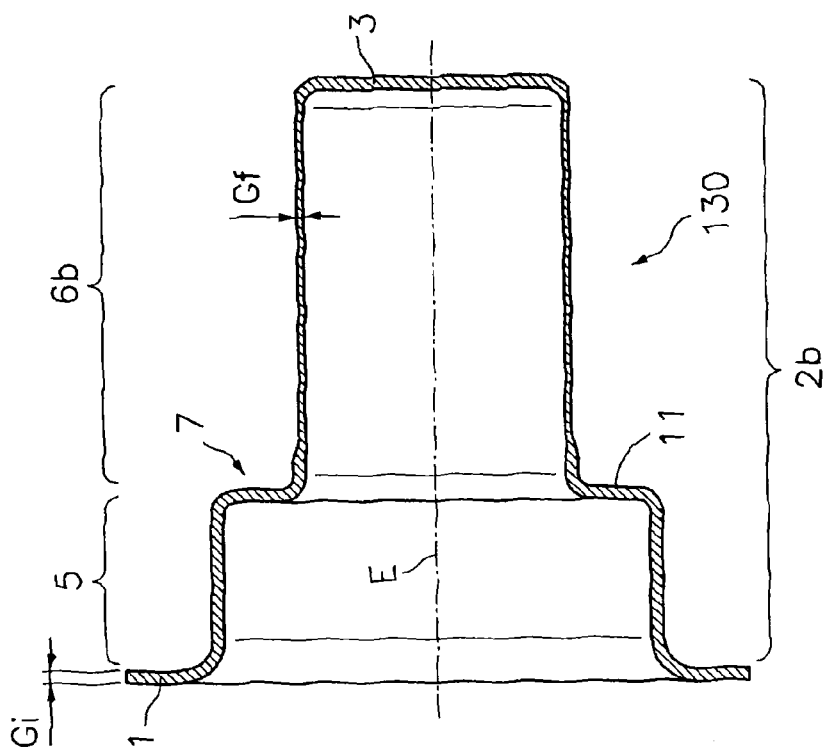
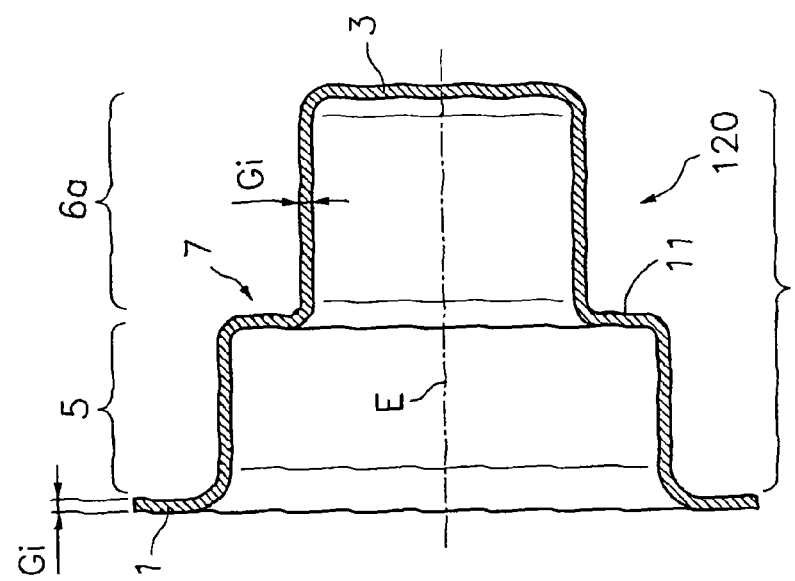

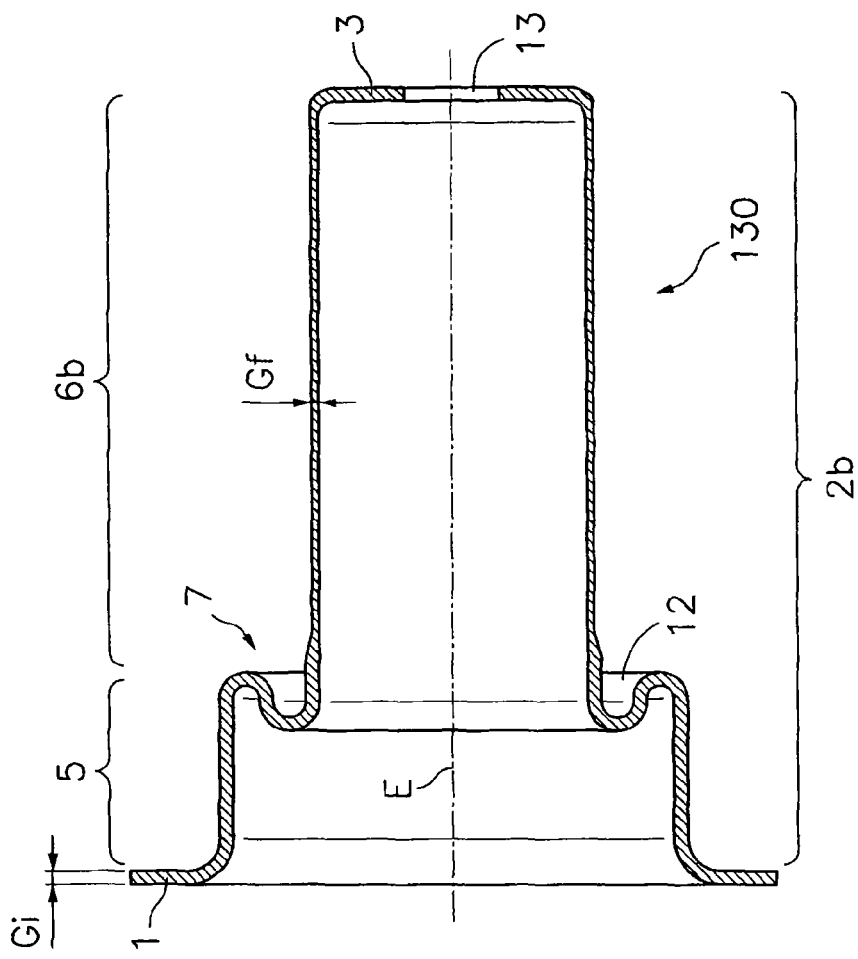
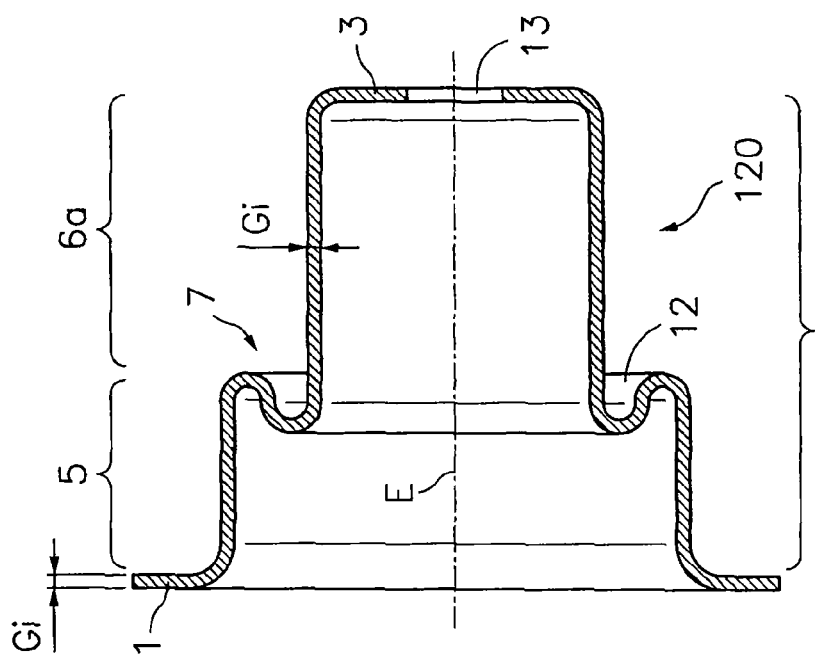

US 8,359,893 B2

METHOD FOR PRODUCING A SHOCK ABSORBER AND SHOCK ABSORBER THUS OBTAINED

This application is a Continuation Application of PCT International Application No. PCT/ES2006/000432 filed Jul. 21, 2006.

FIELD OF THE ART

The present invention relates to a method for producing a shock absorber and a shock absorber obtained by said method. The shock absorber has an application in the automotive field as a bumper crossbeam support in a vehicle.

BACKGROUND OF THE INVENTION

U.S. Pat. No. 6,554,333 discloses a shock absorber comprising an elongated hollow body with a revolution shape with respect to an axis and defining different stepped tube sections of decreasing diameters. Between every two tube sections of different diameters, there is a transition section defining a step with a perimetric wave provided to facilitate the telescopic insertion of one section into the other in case of impact. The end of the larger diameter tube section is joined by welding to a connection plate or member adapted to be fixed in a releasable manner to the vehicle structure. The end of the smaller diameter tube section is inserted in a hole of the bumper crossbeam and joined thereto by welding. The shock absorber is obtained by the plastic deformation of a straight metal tube which is enlarged or reduced in diameter in order to form the different tube sections. The patent does not mention the plastic deformation forming technique used to form the shock absorber.

U.S. Pat. No. 6,854,5754 describes a shock absorber comprising an elongated tubular body with two stepped diameter tube sections, obtained by the plastic deformation of a straight tube. The larger diameter tube section is provided to be joined to a part of the frame of the vehicle and a smaller diameter tube section to be joined to a bumper crossbeam. The tubular body defines a first tube section of a first larger diameter, a second tube section of a second diameter that is smaller than the first one, a step section connecting said first tube section and said second tube section by means of a wavy annular step with an S-shaped cross-section.

U.S. Pat. No. 6,908,129 describes a shock absorber for an automobile comprising an elongated tubular body with several stepped tube sections of decreasing diameters. In an embodiment described in the figures, the elongated tubular body defines two tube sections of different diameters and a stepped section defining a wavy annular step with an S-shaped cross-section. In order to install the shock absorber in a vehicle, the end of the larger diameter tube section is joined to a flat plate perpendicular to the axis of the tubular body.

U.S. Pat. No. 7,021,686 describes another example of a shock absorber for a vehicle based on a tubular body with several tube sections of different diameters or stepped widths.

The shock absorbers described in the patents mentioned above have a substantially constant wall thickness in all the tube sections. A shock absorber in which at least one of the tube sections, such as for example the smaller diameter tube section, had a thickness less than the thickness of the wall of the larger diameter tube section with the purpose of optimizing the weight of the shock absorber and providing a greater resistance only in those tube sections requiring it would be desirable.

Document JP-A-2000240707 discloses a shock absorber comprising a tubular body having a constant inner diameter and two sections of decreasing outer diameter such that it includes a first cylindrical section with a thicker wall, a second cylindrical section with a thinner wall and a transition section between both. The mentioned tubular body is obtained by cylindrical lathe spinning.

Patent DE-A-10002379 describes a one-piece shock absorber having at least two length sections of decreasing cross sections telescope-like arranged and mutually connected through a shoulder. The first length section has a flange and the second length section has a free end closed with an end side. The first and second length sections are arranged along a longitudinal axis and exhibit respective flat sides. The shock absorber is obtained by a deep-drawing procedure, and thereby the thickness of the flange is larger than the wall thickness of the length sections, the greater thickness of the flange providing reinforcement for the flange serving as a mounting surface.

Patent DE-A-19814842 discloses a damping device, capable of absorbing the impact force from frontal, rear and/or side collisions, comprising a hollow body made by deep drawing from sheet metal, plastic or composite material. The sides of the hollow body are deformed by a high pressure procedure to form curved bulges extending in a ring-shape around the body length axis. In an exemplary embodiment, a one piece blank is used to form the hollow body, said blank including a plate, an elongated hollow portion extending from said plate, and an end wall closing at least in part one end of said provisional hollow portion opposite to the plate. An upper section of said elongated hollow portion has a thickness that is thinner than the thickness of a lower section of the elongated hollow portion and the plate.

The shock absorbers of the documents of the prior art mentioned above for connecting to a frame of the vehicle and/or to the bumper crossbeam must be joined by welding to connection parts or directly joined by welding to the frame and/or bumper crossbeam. The weld joining operation can create stress in the assembly that can negatively affect the resistance and/or the behavior of the shock absorber.

Therefore, there is a need for a one piece shock absorber provided with an elongated hollow portion connected at one end to a plate and at least partially closed at the other end with an end wall, wherein at least part of the elongated hollow portion has a thickness thinner than the thickness of the plate, and wherein the shock absorber is able to be produced from a metal sheet portion by a two step method including a spinning technique.

DISCLOSURE OF THE INVENTION

According to a first aspect, the present invention provides a method for producing a shock absorber comprising the following steps. Firstly, providing a planar sheet part with an initial thickness and an initial outline and forming said planar sheet part to the shape of a partially formed part or preform made up of a plate and a provisional hollow portion extending from said plate with a revolution shape with respect to an axis perpendicular to the plate. Then, elongating at least part of a section of the provisional hollow portion of said partially formed part until a formed part is obtained made up of the plate, and an elongated hollow portion extending from the plate with a revolution shape with respect to said axis, where the elongated hollow portion of the formed part is longer than the provisional hollow portion of the partially formed part.

The method generally includes leaving an end wall closing the end of the provisional hollow portion of the partially formed part and/or of the elongated hollow portion of the formed part opposite to the plate, although the mentioned end wall could be eliminated during the forming process of the planar sheet part.

The step of forming the planar sheet part to the shape of a partially formed part can be generally carried out using a drawing technique by means of which a general thickness of the partially formed part is obtained that is substantially the same as said initial thickness.

It must be taken into account that the expression "substantially equal" referred to the thickness of the walls of the part partially formed by drawing in relation to the initial thickness of the planar sheet part intends covering the slight variations experienced as an inevitable result of the process, but in any case they are not significant and are not a desired result. A partially formed part with a provisional hollow portion formed by several sections of different stepped diameters or a single conical section can be obtained with the drawing process.

Alternatively, the step of forming by drawing the planar sheet part to the shape of the partially formed part can be carried out by lathe conical spinning, with which a partially formed part with a provisional hollow portion formed by a single conical section of a provisional thickness that is thinner than said initial thickness as a result of the flow of the material during spinning is obtained.

Preferably, the mentioned step of elongating at least part of a section of the provisional hollow portion of the partially formed part is carried out by a lathe spinning technique, also known as flowturning or embossing with a flow of the material which can be a direct or reverse cylindrical spinning or a conical spinning depending on the cylindrical or conical shape respectively of the section to be elongated. In any of the two cases, the thickness of the wall of the section which is elongated becomes thinner as a result of the spinning operation. Also as result of the spinning, the relative resistance of the material of the wall of the elongated section is increased and its mechanical features are improved.

"Drawing" is understood as a process for molding the planar sheet part between two complementary die halves with the aid of a press in order to confer to the part a three dimensional configuration that is not necessarily a revolution configuration, although for the purposes of the present invention it is convenient that at least the provisional hollow portion have a revolution shape with respect to an axis so as to facilitate the subsequent operations. Drawing can include performing cuts and openings.

"Cylindrical spinning" is understood as a spinning process carried out by rollers on the walls of a cylindrical or substantially cylindrical tubular part while the latter rotates in a lathe on a dolly or in cooperation with a dolly. Cylindrical spinning involves a flowing of the material forming the part and subsequently a thinning of the wall thereof. When the material flows in the same direction in which the rollers move forward the process is called "direct cylindrical spinning". When the material flows in the direction opposite to the forward movement of the rollers the process is called "reverse cylindrical spinning".

"Conical spinning" is understood as a spinning process carried out by rollers on the walls of a planar or conical part while the latter rotates in a lathe on a dolly or in cooperation with a dolly. Conical spinning generally involves flattening the material of the part, and therefore a reduction in the coning angle, and a flow of the material of the part with a subsequent thinning of the thickness of the wall thereof.

According to a second aspect, the present invention provides a shock absorber of the type comprising a plate from which there extends an elongated hollow portion having a revolution shape with respect to an axis perpendicular to said plate, and an end wall in an end of the elongated hollow portion opposite to the plate. The shock absorber of the present invention is characterized in that the plate, said elongated hollow portion and said end wall are a single part and in that at least one section of the elongated hollow portion has a second thickness that is thinner than a first thickness of the plate.

This shock absorber can have different configurations and can be obtained by any one of the variants of the method of the present invention.

BRIEF DESCRIPTION OF THE DRAWINGS

The previous and other features and advantages will be understood more fully from the following detailed description of several embodiments with reference to the attached drawings in which:

FIGS. 7 and 8 are cross-sectional views illustrating a method for producing a shock absorber according to an embodiment of the present invention;

FIGS. 9 and 10 are cross-sectional views illustrating a method for producing a shock absorber according to another embodiment of the present invention;

DETAILED DESCRIPTION OF AN EMBODIMENT

The same alphanumeric references have been used throughout the following detailed description to designate same or equivalent elements in the different embodiments shown.

Figure 1:
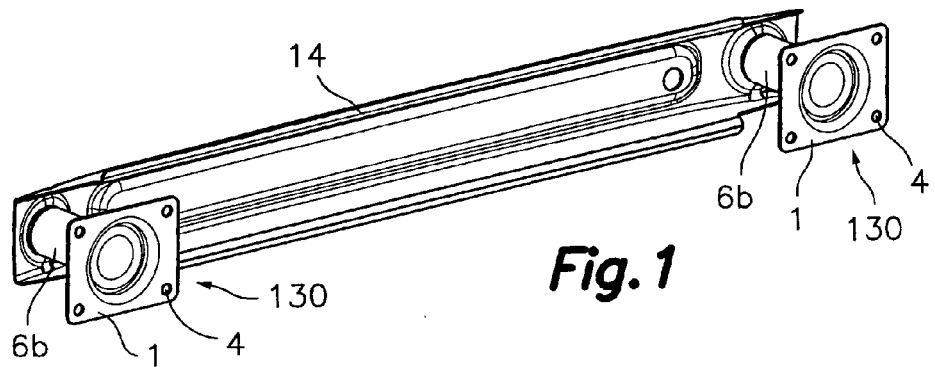
FIG. 1 is a perspective view of a pair of shock absorbers according to an embodiment of the present invention joined to a bumper crossbeam.
Figure 2:
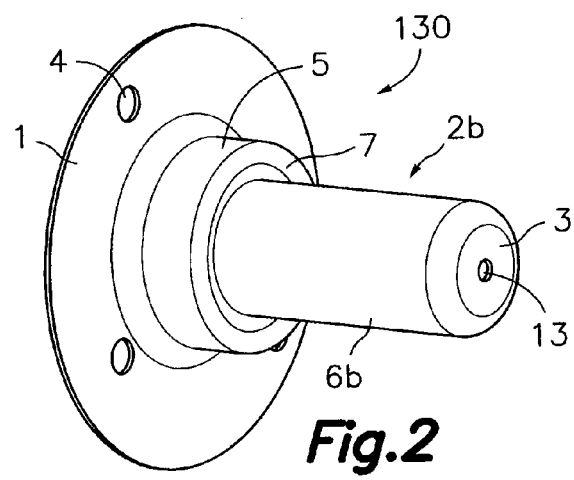
FIG. 2 is a perspective view of a shock absorber according to another embodiment of the present invention.

FIG. 1 illustrates a conventional type bumper crossbeam 14, in the ends of which there are fixed shock absorbers 130 according to an embodiment of the present invention similar to the one shown in FIG. 2.

The shock absorber 130 of FIG. 2 is a single part and comprises a plate 1 from which there extends an elongated hollow portion 2b having a revolution shape with respect to an axis perpendicular to said plate 1, and an end wall 3 arranged parallel to the plate 1 closing the elongated hollow portion 2b in an end opposite to plate 1. The mentioned elongated hollow portion 2b comprises a substantially cylindrical first section 5 extending from plate 1, a substantially cylindrical elongated second section 6b connected to the end wall 3 and a transition section 7 connecting said first and second sections 5, 6b. The first section 5 has an average diameter that is greater than the average diameter of the elongated second section 6b, and the transition section 7 is configured to be deformed with the purpose of facilitating a telescopic insertion of the elongated second section 6b into the first section 5 when an axial force above a predetermined threshold is applied, for example, to the end wall 3. The shock absorber 130 of FIG. 1 is only different from the one shown in FIG. 2 in that the plate 1 is rectangular instead of circular.

The end wall 3 of the shock absorber 130 can have an opening 13 adapted to facilitate the fixing of the end wall 3 to the bumper crossbeam 14 by means of a screw and nut assembly for example, although said fixing will generally be by welding. Plate 1 has openings 4 adapted to facilitate the fixing of a plate 1 to an element of the frame of the vehicle (not shown) by means of corresponding screw and nut assemblies, such that the shock absorbers 130 can be easily disassembled. Furthermore, the use of welding and the stress in the material that this entails is avoided by the mentioned screw and nut assemblies.

Figure 3:
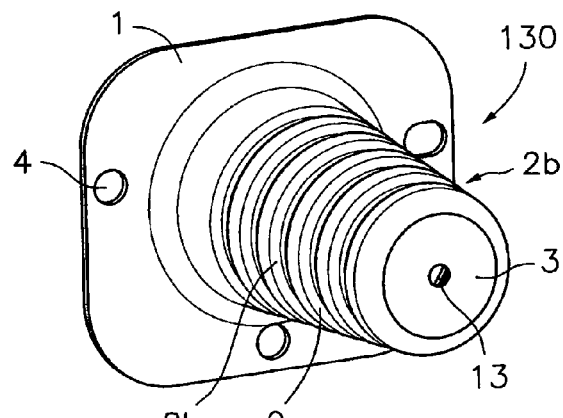
FIG. 3 is a perspective view of a shock absorber according to a further embodiment of the present invention.

The shock absorber 130 of FIG. 3 is also a single part and comprises a plate 1 from which there extends an elongated hollow portion 2b having a revolution shape with respect to an axis perpendicular to said plate 1, and an end wall 3 closing an end of the elongated hollow portion 2b opposite to plate 1. Here, the mentioned elongated hollow portion 2b comprises a single elongated conical section 8b in which there is formed a series of annular channels 9 (better shown in FIG. 13) adapted to bring about an "accordion" folding of the elongated hollow portion 2b when an axial force above a predetermined threshold is applied, for example, to the end wall 3.

Figure 4:
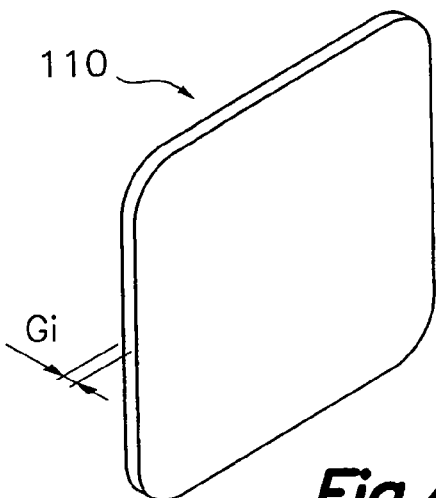
FIGS. 4 to 6 are perspective views of three variants of a planar sheet part used as a starting material for producing the shock absorber of the present invention.
Figure 5:
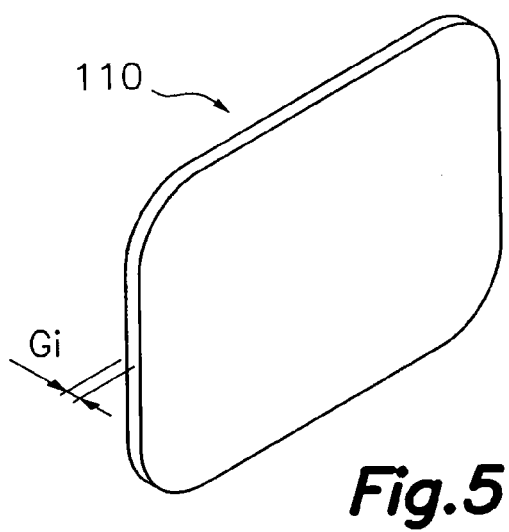
Figure 6:
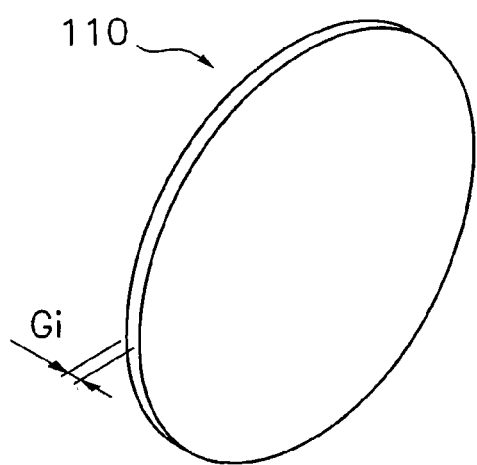

The method for producing a shock absorber according to the present invention will be described below, which method comprises as a first step providing a planar sheet part 110 (shown in FIGS. 4 to 6) of a metallic material, such as steel only by way of example, with an initial thickness Gi and an initial outline. This planar sheet part 110 will be used as a starting material and can have different initial outlines. The initial outline of the planar sheet part 110 can be according to the final outline desired for the finished shock absorber, in which case the initial outline will not be altered by the subsequent processes. By way of example, FIG. 4 shows a planar sheet part 110 with a square initial outline, preferably with rounded corners, FIG. 5 shows a planar sheet part 110 with a rectangular initial outline, also with rounded corners, and FIG. 6 shows a planar sheet part 110 with a circular initial outline. Obviously any other suitable type of initial outline can be used for the planar sheet part 110. The use of a planar sheet part 110 with an initial outline that is larger than the desired final outline, which will be cut in a subsequent operation as explained below, has also been foreseen. It will be observed that the planar sheet part 110 shown in FIGS. 4 to 6 does not include the openings 4 and 13 because these openings can be advantageously formed in a subsequent operation. However, there is no technical restriction for the openings 4 and/or 13 to be present in the planar sheet part 110 used as the starting material.

The mentioned first step of providing a planar sheet part 110 described above is common to all the embodiments of the method of the present invention.

In relation to FIGS. 7 and 8, second and third steps of an embodiment of the method of the invention are described below. The second step of the method comprises forming the mentioned planar sheet part 100 to the shape of a partially formed part 120 or preform (FIG. 7) made up of a plate 1, a provisional hollow portion 2a extending from said plate 1 with a revolution shape with respect to an axis E perpendicular to the plate 1, and an end wall 3 closing an end of said provisional hollow portion 2a opposite to the plate 1. In this embodiment, the step of forming the planar sheet part 110 to the shape of the partially formed part 120 is carried out by using a drawing technique by which a general thickness of the partially formed part 120 is obtained that is substantially the same as said initial thickness Gi. The partially formed part 120 has been formed by drawing such that the provisional hollow portion 2a has a first section 5 extending from the plate 1, a second section 6a after said first section 5 and connected with the end wall 3, and a transition section 7 connecting said first and second sections 5, 6a, where the first section 5 has an average diameter that is greater than the average diameter of the second section 6a. The mentioned transition section 7 is formed in the form of an annular step 11 with a planar portion parallel to the plate 1. All the transition edges between the plate 1, the different sections 5, 6a, 7 and the end wall 3 are preferably rounded. The mentioned drawing operation is also suitable for forming the mentioned openings 4, 13 of plate 1 and the of the end wall 3 respectively, as well the cutting of the initial outline of plate 1 so as to produce the desired final outline, if this were the case.

FIG. 8 illustrates the third and last step of this embodiment of the method of the invention, which comprises elongating a substantial part of the second section 6a of the provisional hollow portion 2a of the partially formed part 120 until a formed part 130 is obtained made up of the plate 1, an elongated hollow portion 2a extending from the plate 1 with a revolution shape with respect to the axis E, and the end wall 3 closing an end of said elongated hollow portion 2b opposite to the plate, where the elongated hollow portion 2b comprises the first section 5 and the transition section 7 which have not been altered, and an elongated second section 6b. Obviously, the elongated second section 6b is longer than the second section 6a and therefore the elongated hollow portion 2b of the formed part 130 is longer than the provisional hollow portion 2a of the partially formed part 120. The step of elongating the second section 6a of the provisional hollow portion 2a of the partially formed part 120 further comprises making the wall of the second section 6a of the provisional hollow portion 2a thinner.

The first and second sections 5, 6a of the partially formed part 120 are substantially cylindrical, although for the purposes of the embodiment of the present invention, it is only essential for the second section 6a to be cylindrical. A suitable technique for carrying out the third step of the method described above is a direct or reverse cylindrical spinning technique with a flow of material by which the elongated second section 6b of the provisional hollow portion 2b of the formed part 130 is longer and with a final thickness Gf that is thinner than the initial thickness Gi.

In relation to FIGS. 9 and 10, second and third steps of another embodiment of the method of the invention are described below, which method is similar to the one described above in relation to FIGS. 7 and 8 except that the forming by drawing operation which forms the second step comprises forming the transition section 7 with an annular step 12 defining an annular wave between the end of the first section 5 and the base of the second section 6a of the partially formed part 120, as shown in FIG. 9. The mentioned wavy annular step 12 has an S-shaped cross section which is not altered during the performance of the third and last step of the method consisting of elongating and thinning the second section 6a of the provisional hollow portion 2a of the partially formed part 120 until the elongated second section 6b of the elongated hollow portion 2b of the formed part 130 is provided, such that the formed part 130 shown in FIG. 10 includes this same wavy annular step 12 connected to the end of the first section 5 and the base of the elongated second section 6b.

Figure 11:
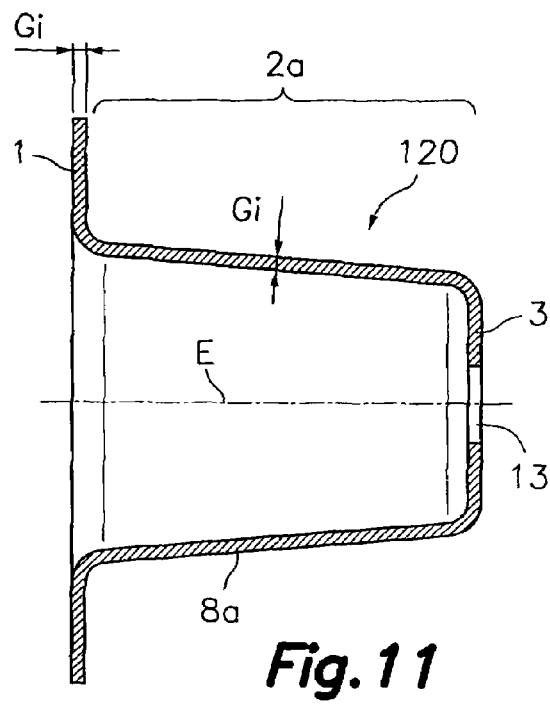
FIGS. 11 to 13 are cross-sectional views illustrating a method for producing a shock absorber according to another additional embodiment of the present invention.

In relation to FIGS. 11 and 13, second, third and fourth steps of another additional embodiment of the method of the invention are described below. In this embodiment, the second step of the method comprises forming the planar sheet part 110 by drawing to the shape of a partially formed part 120 shown in FIG. 11 which has a provisional hollow portion 2a with a single conical section 8a with a larger diameter end adjacent to the plate 1 and a smaller diameter end away form the plate 1 and connected to the closing wall 3. The closing wall 3 is substantially parallel to the plate 1 and the transition edges between the plate 1, the conical section 8a and the closing wall 3 are rounded. The thickness of the wall of the conical section 8a and the rest of the partially formed part 120 is substantially the same as the thickness Gi of the planar sheet part 110 used as the starting material. The drawing process is also suitable for forming the openings 4, 13 of the plate 1 and of the end wall 3 respectively, as well as the cutting of the initial outline of the plate 1 so as to produce the desired final outline, if this were the case.

Figure 12:
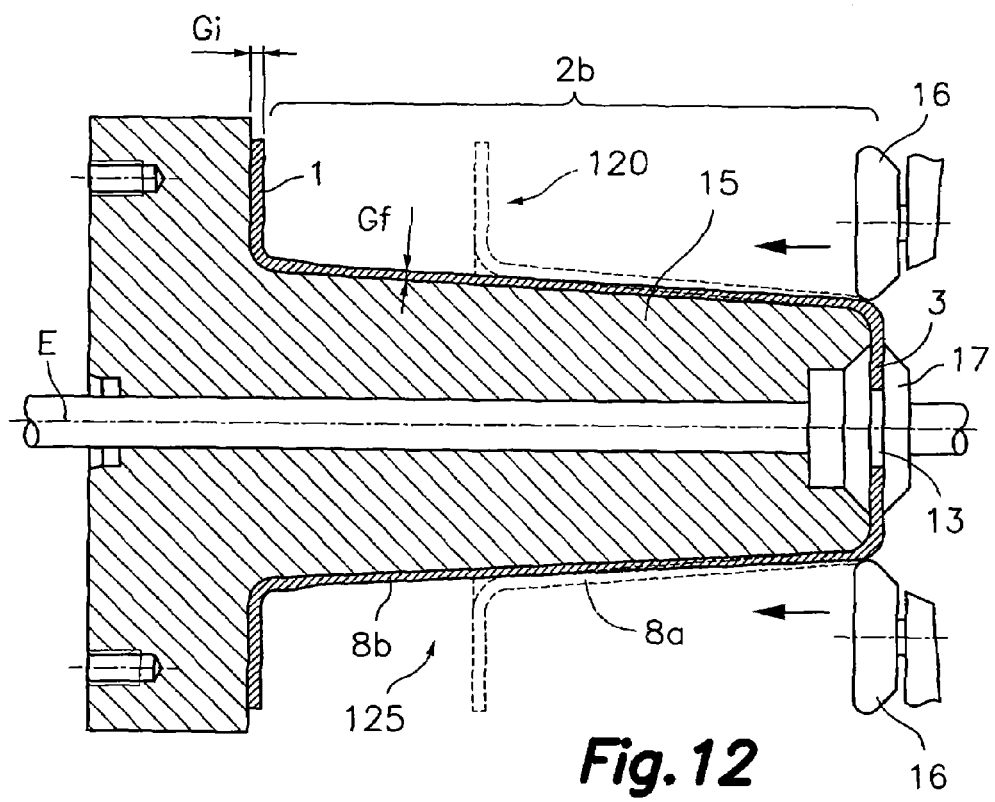

The third step of this embodiment of the method of the present invention is illustrated in FIG. 12 and comprises elongating said single conical section 8a of the provisional hollow portion 2a of the partially formed part 120 until producing a second partially formed part 125 with a plate 1 from which there extends a single elongated conical section 8b which is closed in its end opposite to the plate 1 by the end wall 3. A suitable technique for carrying out this third step of the method is a conical spinning technique consisting of placing the first partially formed part 120 in a first dolly 15 concentrically fixed to the plate of a lathe (not shown) and making rollers 16 move forward pressing the material of the first partially formed part 120 against the surface of said first dolly 15 while the partially formed part 120 and the first dolly 15 are made to turn by the lathe. The partially formed part 120 is secured to the first dolly 15 by an axial live center 17. The mentioned surface of the first dolly 15 has a shape adapted to the revolution shape with respect to the axis E desired for the second partially formed part 125. By the effect of the stretch and flow of material produced by the conical spinning operation, the wall of the mentioned elongated conical section 8b of the second partially formed part 125 results with a final thickness Gf that is thinner than the initial thickness Gi and the initial coning angle of the conical section 8a of the first partially formed part 120 results slightly reduced in the elongated conical section 8b of the second partially formed part 125 shown in FIG. 12. A suitable coning angle for the elongated conical section 8b of the second partially formed part 125 will generally not exceed 15° (inclination of the wall with respect to the axis E).

The fourth and last step of this embodiment of the method is described below with reference to FIG. 13. This fourth step comprises forming one or more annular channels 9 in said single elongated conical section 8b of the elongated hollow portion 2b of the second partially formed part 125 by means of a lathe forming technique by means of rollers so as to produce the formed part 130 shown in FIG. 13. To that end, an inner part of the wall of the elongated conical section 8b of the second partially formed part 125 is supported on a second dolly 18 inserted in the elongated hollow portion 2b and coaxially fixed to the plate of a lathe (not shown). The second dolly 18 has a conical outer surface in which annular runners 18a configured according to the inner profile of the annular channels 9 which are wanted to be formed in the elongated conical section 8b are formed. The coning angle of the second dolly 18 is identical to the coning angle of the elongated conical section 8b. However, the average diameter of the second dolly 18 is much smaller than the average diameter of the elongated conical section 8b such that the axis E of the partially formed part 125 is displaced from the axis of the lathe Et. An axial live center 19 aligned with the axis of the lathe Et secures the second partially formed part 125 to the second dolly 18. There is a roller 20 assembled on a moveable member 21, which roller has annular protrusions 20a configured according to the inner profile of the annular channels 9 which are desired to be formed in the elongated conical section 8b and opposite to the mentioned annular runners 18a of the second dolly 18a.

Figure 13:
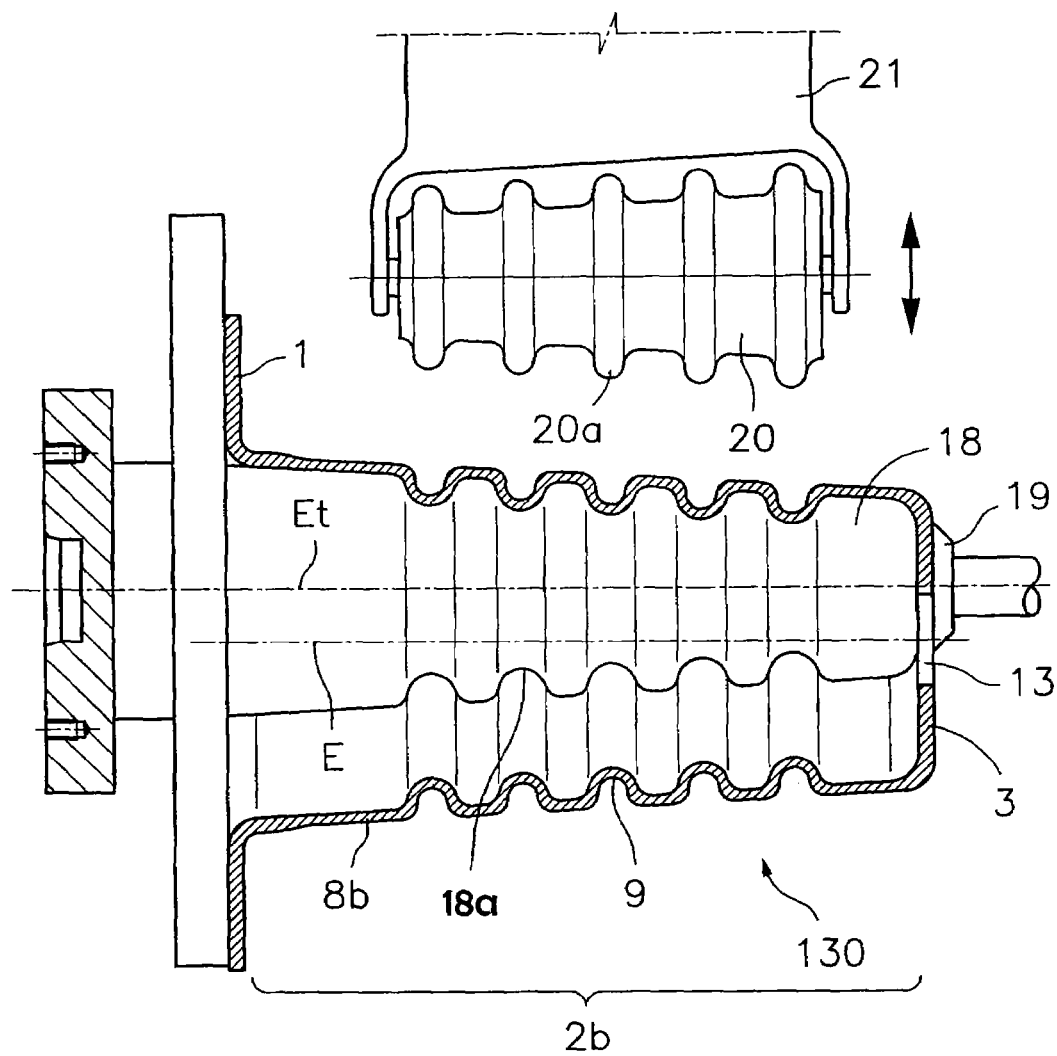

The mentioned roller 20 is applied against the wall of the elongated conical section 8b of the second partially formed part 125 so as to produce a formed part 130, shown in FIG. 13, made up of the plate 1, an elongated hollow portion 2b with a single conical section 8b extending from the plate 1 and in which there is formed a series of annular channels 9, and the end wall 3 closing an end of said elongated hollow portion 2b opposite to the plate 1. The wall of the conical section 8b, including the annular channels 9, has a thickness that is thinner than the initial thickness Gi of the planar sheet part 110 used as the starting material, said initial thickness Gi being substantially the same as the thickness of the plate 1 and of a transition area between the plate 1 and the elongated conical section 8b of the formed part 130.

Figure 14:
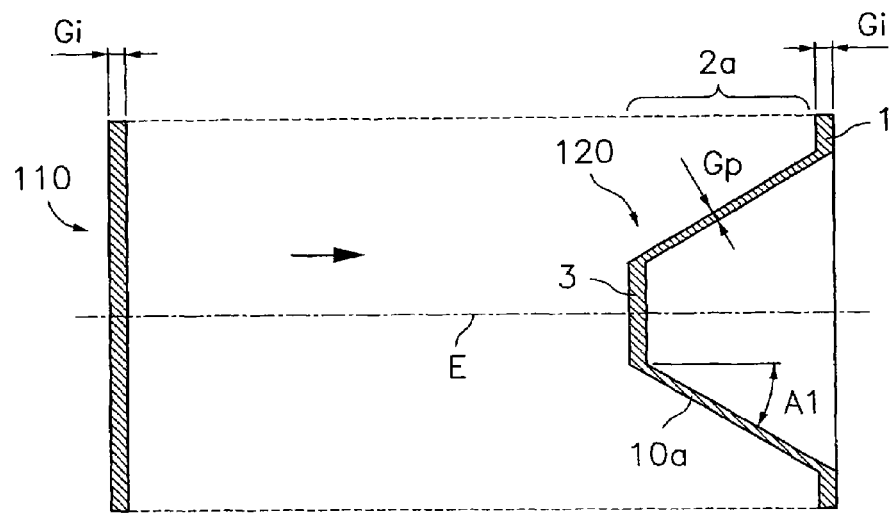
FIGS. 14 and 15 are schematic cross-sectional views illustrating a method for producing a shock absorber according to yet another additional embodiment of the present invention.

In relation to FIGS. 14 and 15, first, second and third steps of another additional embodiment of the method of the invention similar to the one described above in relation to FIGS. 11 to 13 are described below. The difference lies in that in this embodiment, the step of forming the planar sheet part 110 to the shape of the partially formed part 120 is carried out by means of a conical spinning technique instead of a drawing technique. As schematically illustrated in FIG. 14, after the first step of providing a planar sheet part 110 of an initial thickness Gi (on the left part of FIG. 14), the second step comprises forming the planar sheet part 110 directly by a first conical spinning process until the partially formed part 120 (on the right part of FIG. 14) is produced, which part is made up of a plate 1 from which there extends a provisional hollow portion 2a and an end wall 3 closing said provisional hollow portion 2a, the provisional hollow portion 2a being formed by a single conical section 10a having a larger diameter end connected to the plate 1 and a smaller diameter end connected to the end wall 3. As a result of this first conical spinning process, the provisional hollow portion 2a of the partially formed part 120 has a provisional thickness Gp that is thinner than said initial thickness Gi and a first coning angle A1.

Given that the reduction of the thickness in the wall of the part produced by a conical spinning process follows the sine rule, the provisional thickness Gp of the wall of the conical section 10a will be:

$$Tp = Ti \cdot \sin A1$$

Figure 15:
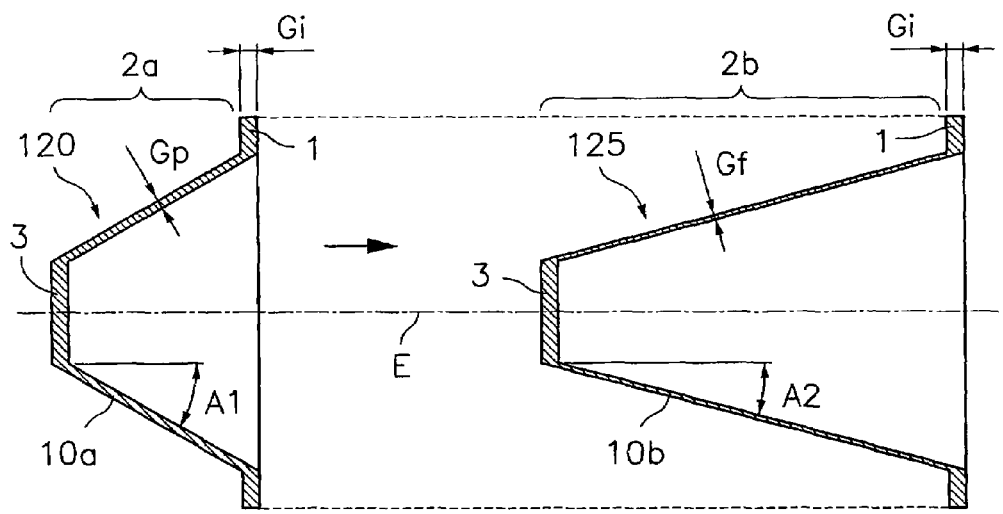

FIG. 15 illustrates the third step of this embodiment of the present invention, which comprises elongating the mentioned single conical section 10a of the provisional hollow portion 2a of the partially formed part 120 (on the left part of FIG. 15) by means of a second conical spinning operation so as to produce a second partially formed part 125 (on the right part of FIG. 15) made up of the plate 1 from which there extends an elongated hollow portion 2b and the end wall 3 closing said elongated hollow portion 2b, the elongated hollow portion 2b being formed by a single elongated conical section 10b having a final thickness Gf that is thinner than said provisional thickness Gp and a second coning angle A2 smaller than said first coning angle A1 of the provisional conical section 10a of the partially formed part 120. According to the sine rule, the mentioned final thickness Gf is:

$$Tf = Tp \cdot \frac{\sin A1}{\sin A2}$$

This additional embodiment of the method of the present invention include a fourth step which comprises forming one or more annular channels (not shown) in said single elongated conical section 10b of the elongated hollow portion 2b of the second partially formed part 125 by means of a lathe forming technique by rollers similar to the one described above in relation to FIG. 13 so as to produce a formed part 130 with shape features similar to those of said formed part 130 shown in FIG. 13.

In this embodiment, it will be observed that due to the double conical spinning operation, a severe reduction is obtained in the thickness of the wall of the single elongated conical section 10b, including the annular channels 9, of the elongated hollow portion 2b of the formed part 130, which may be suitable for some applications due to the increase in the relative resistance produced by the spinning and the relative lightness of the formed part 130.

The essential features of the shock absorber of the present invention are that it is formed by a single part defining a plate 1 from which there extends an elongated hollow portion 2b having a revolution shape with respect to an axis E perpendicular to said plate 1, and that at least one section of the elongated hollow portion 2b has a second thickness Gf that is thinner than a first thickness Gi of the plate 1.

A shock absorber including the mentioned essential features can be produced by any one of the aforementioned embodiments of the method of the present invention. With the method of the present invention, a formed part 130 including an end wall 3 completely or partially closing an end of the elongated hollow portion 2b opposite to the plate 1 is inevitably obtained, said end wall 3 being integral with the same single part as the plate 1 and the elongated hollow portion 2b. Given that in some applications this end wall 3 may not be necessary, the method can include as an additional step a cutting operation transverse to the axis E in order to eliminate the end wall 3. However, in most applications the shock absorber preferably includes the end wall 3, which can have a planar portion parallel to the plate 1 so as to facilitate its fixing to a bumper crossbeam in the manner explained above in relation to FIGS. 1 and 2.

According to the present invention, the shock absorber preferably includes one or more configurations 9, 11, 12 intended to bring about a controlled deformation of the elongated hollow portion 2b in the event of an impact, i.e., in the event that an axial force above a predetermined threshold is applied, for example, to the end wall 3. These controlled deformation techniques can be, for example, in the form of the annular steps 11 and 12 forming part of the transition section 7 described in relation to FIGS. 7-8 and 9-10 respectively, or in the form of the annular channels 9 described in relation to FIG. 13.

A person skilled in the art will be able to introduce modifications and variations to the shown and described embodiments without departing from the scope of the present invention as it is defined in the attached claims.

The invention claimed IS:

1. A method for producing a shock absorber for being used as a vehicle bumper crossbeam support, comprising the steps of:
providing a planar sheet part having an initial thickness and an initial outline;
forming by using a drawing technique said planar sheet part into a partially formed part having a general thickness that is substantially the same as said initial thickness, said partially formed part comprising a plate, a provisional hollow portion extending from said plate, and an end wall closing said provisional hollow portion at one end thereof opposite to the plate, the provisional hollow portion having a revolution shape with respect to an axis perpendicular to the plate, and comprising a first section connected to the plate and having a first average diameter, a second section connected to said end wall and having a second average diameter that is less than said first average diameter, and a transition section connecting said first and second sections, said transition section being configured to act as a deformable configuration intended to bring about a controlled deformation in the event that an axial force above a predetermined threshold is applied; and
elongating by using a spinning technique involving material flowing at least part of said second section of the provisional hollow portion of the partially formed part until obtaining a formed part with an elongated hollow portion having an elongated second section which is longer than the second section of the partially formed part, and at least part of which has a final thickness that is thinner than the initial thickness, said formed part being the shock absorber.

2. The method according to claim 1, wherein the step of forming the planar sheet part into the partially formed part by using the drawing technique further comprises cutting one or more openings in the plate and/or in said end wall.

3. The method according to claim 1, wherein the step of forming the planar sheet part into the shape of the partially formed part by using the drawing technique comprises forming the second section of the provisional hollow portion as substantially cylindrical second section.

4. The method according to claim 3, wherein the step of forming the planar sheet part into the shape of the partially formed part by using the drawing technique comprises forming the first section of the provisional hollow portion as substantially cylindrical first section.

5. The method according to claim 1, wherein the step of forming the planar sheet part into the shape of the partially formed part by using the drawing technique comprises forming the transition section as an annular step with a planar portion parallel to the plate between the first section and the second section.

6. The method according to claim 1, wherein the step of forming the planar sheet part into the shape of the partially formed part by using the drawing technique comprises forming the transition section as an annular step defining an annular wave between the first section and the second section.

7. The method according to claim 1, wherein the step of forming the planar sheet part into the shape of the partially formed part by using the drawing technique comprises forming rounded transition edges between the plate and the first section, between the first section and the transition section, between the transition section and the second section, and between the second section and the end wall.

8. The method according to claim 1, wherein said spinning technique is a direct cylindrical spinning technique with a flow of material.

9. The method according to claim 1, wherein said spinning technique is a reverse cylindrical spinning technique with a flow of material.

10. The method according to claim 1, wherein said planar sheet part is provided having said initial outline according to a final outline of a plate of a shock absorber to be obtained.

11. The method according to claim 1, wherein the step of forming the planar sheet part into the partially formed part using a the drawing technique further comprises cutting said initial outline to obtain a final outline for the plate.

12. The method according to claim 1, further comprising a step of cutting the elongated second section of the elongated hollow portion transverse to the axis in order to eliminate said end wall.

\* \* \* \* \*